(12) United States Patent
Iechika et al.

(10) Patent No.: US 12,620,825 B2
(45) Date of Patent: May 5, 2026

(54) ELECTRIC POWER SUPPLY-DEMAND ADJUSTMENT METHOD FOR ELECTRIC POWER SYSTEM, AND MANAGEMENT DEVICE FOR ELECTRICITY STORAGE DEVICE

(71) Applicant: Prime Planet Energy & Solutions, Inc., Tokyo (JP)

(72) Inventors: Masanori Iechika, Toyota (JP); Katsushi Saito, Nagakute (JP); Masaru Ando, Seto (JP); Hideyuki Nagai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 706 days.

(21) Appl. No.: 18/146,465

(22) Filed: Dec. 27, 2022

(65) Prior Publication Data

US 2023/0208173 A1     Jun. 29, 2023

(30) Foreign Application Priority Data

Dec. 28, 2021     (JP) ................................. 2021-214154

(51) Int. Cl.
*H02J 7/00*          (2006.01)
*B60L 53/51*        (2019.01)
        (Continued)

(52) U.S. Cl.
CPC .............. *H02J 7/007* (2013.01); *B60L 53/51* (2019.02); *B60L 53/52* (2019.02); *B60L 53/62* (2019.02);
        (Continued)

(58) Field of Classification Search
None
See application file for complete search history.

(56) References Cited

U.S. PATENT DOCUMENTS 9,751,417 B2 * 9/2017 Landau-Holdsworth ....................
                                                    H04W 12/08
2012/0249088 A1 * 10/2012 Abe ........................ H02J 7/007
                                                    320/164

(Continued)

FOREIGN PATENT DOCUMENTS

JP          2015005205 A      1/2015
JP          2021033736 A      3/2021

OTHER PUBLICATIONS

K. Rahbar, M. R. Vedady Moghadam, S. K. Panda and T. Reindl, "Shared energy storage management for renewable energy integration in smart grid," 2016 IEEE Power & Energy Society Innovative Smart Grid Technologies Conference (ISGT), Minneapolis, MN, USA, 2016, pp. 1-5. (Year: 2016).*

(Continued)

*Primary Examiner* — Ariel Mercado-Vargas
(74) *Attorney, Agent, or Firm* — HAUPTMAN HAM, LLP

(57)          ABSTRACT

An electric power supply demand adjustment method disclosed herein is a method in which supply and demand of electric power on the electric power system is adjusted by inputting, from an electricity storage device that can store electric power generated using renewable energy, at least electric power, to the electric power system. The method includes acquiring usage history information indicating history of usage of a shared vehicle by a tracked person, registered in advance in a manner associated with an electric power provider, notifying the electric power provider of the acquired usage history information of the tracked person, calculating an electric power amount to be input from the electricity storage device to the electric power system on the basis of notification of the usage history information, and (Continued)

causing the electricity storage device to input the calculated electric power amount to the electric power system.

12 Claims, 4 Drawing Sheets

(51) Int. Cl.
  *B60L 53/52*     (2019.01)
  *B60L 53/62*     (2019.01)
  *B60L 58/10*     (2019.01)
  *G05B 19/042*    (2006.01)
  *H02J 3/00*      (2006.01)
  *H02J 3/32*      (2006.01)
(52) U.S. Cl.
  CPC ............ *B60L 58/10* (2019.02); *G05B 19/042* (2013.01); *H02J 3/004* (2020.01); *H02J 3/32* (2013.01); *G05B 2219/2639* (2013.01); *H02J 2300/20* (2020.01)

(56)              References Cited

U.S. PATENT DOCUMENTS

2013/0110296 A1*  5/2013  Khoo ................... G06Q 20/409
                                                    700/286
2015/0039391 A1*  2/2015  Hershkovitz ........ G01R 31/382
                                                    705/7.31
2015/0306968 A1*  10/2015  Ohira .................... B60L 53/665
                                                    307/24
2018/0165727 A1*  6/2018  Gaither .................. B60L 53/00
2018/0285989 A1*  10/2018  Dong ..................... G06Q 50/06
2019/0152329 A1*  5/2019  Onodera ............... B60L 53/665
2019/0202304 A1*  7/2019  Moghe ................... B60L 53/38
2021/0192153 A1*  6/2021  Kunieda ................ H04N 1/028
2021/0344200 A1*  11/2021  Clifton ...................... H02J 3/32
2022/0078069 A1*  3/2022  Shibuya ............. H02J 7/00032
2022/0158455 A1*  5/2022  Kusano ................. B60L 53/665
2022/0158470 A1*  5/2022  Murai .................... B60L 53/62

OTHER PUBLICATIONS

Wolf-Peter Schill, "Electricity Storage and the Renewable Energy Transition," Joule 4, Oct. 14, 2020, pp. 2047-2064. (Year: 2020).*

Cox, Brian & Bauer, Christian & Mendoza Beltran, Angelica & van Vuuren, Detlef P. & Mutel, Christopher L., "Life cycle environmental and cost comparison of current and future passenger cars under different energy scenarios," 2020, Applied Energy, Elsevier, vol. 269(C). (Year: 2020).*

Auke Hoekstra, "The Underestimated Potential of Battery Electric Vehicles to Reduce Emissions" Joule 3, Jun. 19, 2019, pp. 1404-1414. (Year: 2019).*

* cited by examiner

ELECTRIC POWER SUPPLY-DEMAND ADJUSTMENT METHOD FOR ELECTRIC POWER SYSTEM, AND MANAGEMENT DEVICE FOR ELECTRICITY STORAGE DEVICE

CROSS REFERENCE TO RELATED APPLICATIONS

The present application claims priority from Japanese Patent Application No. 2021-214154 filed on Dec. 28, 2021, which is incorporated by reference herein in its entirety.

BACKGROUND

The technology disclosed herein relates to an electric power supply-demand adjustment method for an electric power system, and to a management device for an electricity storage device.

In recent years, there is demand for reducing carbon dioxide ($CO_2$) emissions to reduce the load on the global environment, since $CO_2$ is a global greenhouse gas. Examples of effective means capable of reducing $CO_2$ emissions include obtaining electric power by using renewable energy such as solar power, waterpower, wind power, geothermal power, biomass, and so forth, and using shared vehicles.

Japanese Patent Application Publication No. 2015-005205 discloses a system including means for calculating an electric power consumption amount of an electric vehicle between a first station and a second station, and an electric power consumption amount per person from a count of passengers riding the electric vehicle in this section, means for registering an electric power amount for a passenger of the electric vehicle to sell, and means for converting an electric power amount for the passenger to pay into a fare. According to this system, prior to boarding the electrical vehicle, a passenger of the electric vehicle makes notification regarding an electric power amount that can be sold, out of electric power obtained from an electricity generating device that the passenger may own, such as solar power electricity generation, and can use the electric vehicle by paying a monetary amount obtained by subtracting a monetary amount, obtained by selling electricity, from the fare for using the electric vehicle.

Also, Japanese Patent Application Publication No. 2021-033736 discloses a control device of a vehicle equipped with a $CO_2$ recovery device, in which, in a case where there is a passenger in the vehicle, the amount of carbon dioxide recovered by the $CO_2$ recovery device is calculated, and an incentive is imparted based on this data. Described therein is that usage of vehicles equipped with $CO_2$ recovery devices will be promoted.

SUMMARY

However, in the technology described in Japanese Patent Application Publication No. 2015-005205 and Japanese Patent Application Publication No. 2021-033736, description is made only on the user him/herself using the electric vehicle or the vehicle equipped with the $CO_2$ recovery device, and there is no disclosure regarding usage by those other than that person (e.g., family or the like of the person). Accordingly, there is demand for providing a framework in which the user him/herself and the family thereof and so forth can also obtain gain, thereby further reducing the load on the global environment.

With the foregoing in view, it is an object of the present disclosure to provide an electric power supply-demand adjustment method for an electric power system that reduces the load on the global environment. Another object thereof is to provide a management device that suitably implements this electric power supply-demand adjustment method.

In order to solve the above problem, the technology disclosed herein provides the following electric power supply-demand adjustment method. The electric power supply-demand adjustment method disclosed herein is a method for an electric power system in which supply and demand of electric power on the electric power system is adjusted by inputting, from an electricity storage device that is capable of storing electric power generated using renewable energy, at least the electric power, to the electric power system. The electricity storage device is configured to be capable of inputting the electric power from the electricity storage device to the electric power system. The electric power supply-demand adjustment method includes acquiring usage history information indicating history of usage of a shared vehicle by a tracked person, registered in advance in a manner associated with an electric power provider that provides the electric power from the electricity storage device to the electric power system, notifying the electric power provider of the acquired usage history information of the tracked person, calculating an electric power amount to be input from the electricity storage device to the electric power system on the basis of notification of the usage history information, and causing the electricity storage device to input the calculated electric power amount to the electric power system.

By providing a framework in which the tracked person that is registered in association with the electric power provider can safely use the shared vehicle, usage of the shared vehicle is promoted. Also, calculating the electric power amount to be input to the electric power system from the electricity storage device storing electric power generated using renewable energy, based on this information being provided, promotes circulation of electric power that places a smaller load on the environment. Thus, an electric power supply-demand adjustment method that reduces the load on the global environment can be provided.

According to a mode of the electric power supply-demand adjustment method disclosed herein, in the calculating of the electric power amount, the greater a count of times of notifying the electric power provider of the usage history information is, the more the electric power amount calculated as the electric power amount to be input from the electricity storage device to the electric power system may be increased.

According to this configuration, circulation of electric power with little environmental load is further promoted.

According to a mode of the electric power supply-demand adjustment method disclosed herein, the usage history information acquired in the acquiring of the usage history information may include at least boarding information indicating that the tracked person has boarded the shared vehicle. Also, the usage history information acquired in the acquiring of usage history information may include at least disembarkation information indicating that the tracked person has disembarked from the shared vehicle. Also, in the calculating of the electric power amount, in a case of notifying the electric power provider of the boarding information and the disembarkation information as the usage history information, the electric power amount calculated as the electric power amount to be input from the electricity storage device to the electric power system may be increased as compared to a case of notifying of one of the boarding information and the disembarkation information.

According to this configuration, the electric power provider who can provide electric power generated using renewable energy can allow the tracked person to ride the shared vehicle with further ease of mind. Providing usage history of the shared vehicle by this tracked person further promotes circulation of electric power with little environmental load.

According to a mode of the electric power supply-demand adjustment method disclosed herein, acquiring a provision request requesting the electricity storage device to provide the electric power to the electric power system may be further included. In the causing of the electricity storage device to input electric power to the electric power system, in a case of acquiring the provision request in the acquiring of the provision request, the electricity storage device may be caused to input to the electric power system an electric power amount exceeding the electric power amount calculated in the calculating of the electric power amount. Also, in a mode including acquiring the provision request, in the causing of the electricity storage device to input electric power to the electric power system, a predetermined incentive may be calculated in a case in which the electricity storage device is caused to input to the electric power system an electric power amount exceeding the electric power amount calculated in the calculating of the electric power amount.

According to this configuration, electric power generated using renewable energy can be supplied at a timing at which electric power is needed on the electric power system.

According to another aspect, the technology disclosed herein provides a management device of an electricity storage device. The management device disclosed herein is a management device of an electricity storage device, the management device managing an electric power circulation amount of the electricity storage device that stores electric power generated using renewable energy and that is connected so as to be capable of inputting the stored electric power to an electric power system. The management device may include a first acquirer configured to acquire usage history information indicating history of usage of a shared vehicle by a tracked person, registered in advance in a manner associated with an electric power provider that manages the electricity storage device. The management device may include a notification manager configured to transmit the usage history information of the tracked person acquired by the first acquirer to a communication terminal of the electric power provider. The management device may include an electric power amount calculator configured to calculate an electric power amount to be input from the electricity storage device to the electric power system on the basis of the notification manager having transmitted the usage history information to the communication terminal of the electric power provider. The management device may include a discharge controller configured to control discharge operations of the electricity storage device, to input the electric power amount calculated by the electric power amount calculator from the electricity storage device to the electric power system.

According to this configuration, a management device that provides the electric power supply-demand adjustment method for reducing the load on the global environment is suitably realized.

According to a mode of the management device disclosed herein, the greater a count of times of the notification manager transmitting the usage history information of the tracked person to the communication terminal of the electric power provider is, the more the electric power amount calculator may increase the electric power amount calculated as the electric power amount to be input from the electricity storage device to the electric power system.

According to this configuration electric power generated using renewable energy is suitably supplied to the electric power system.

According to a mode of the management device disclosed herein, the usage history information acquired by the first acquirer may include at least one of boarding information indicating that the tracked person has boarded the shared vehicle, and disembarkation information indicating that the tracked person has disembarked from the shared vehicle. Also, in a case of transmitting the boarding information and the disembarkation information to the communication terminal of the electric power provider as the usage history information, the electric power amount calculator may be configured to increase the electric power amount calculated as the electric power amount to be input from the electricity storage device to the electric power system as compared to a case of transmitting one of the boarding information and the disembarkation information to the communication terminal of the electric power provider.

According to a mode of the management device disclosed herein, a second acquirer configured to acquire a provision request requesting the electricity storage device to provide the electric power to the electric power system may be further included. In a case of the second acquirer having acquired the provision request, the discharge controller may control discharge operations of the electricity storage device to input from the electricity storage device to the electric power system an electric power amount exceeding the electric power amount calculated by the electric power amount calculator. Also, in a mode including the second acquirer, an incentive calculator configured to calculate an incentive to be imparted to the electric power provider may further be included. The incentive calculator may be configured to calculate a predetermined incentive, in a case in which the discharge controller controls the discharge operations of the electricity storage device so as to input electric power exceeding the electric power amount calculated by the electric power amount calculator from the electricity storage device to the electric power system.

DETAILED DESCRIPTION

An embodiment of an electric power supply-demand adjustment method and a management device disclosed herein will be described below with reference to the Figures. The embodiment described here is not intended to limit the present disclosure in particular, as a matter of course. The present disclosure is not limited by the embodiment described herein, unless specifically stated otherwise. Also, members and parts having the same effects are denoted by the same signs as appropriate, and repetitive description will be omitted as appropriate.

Figure 1:
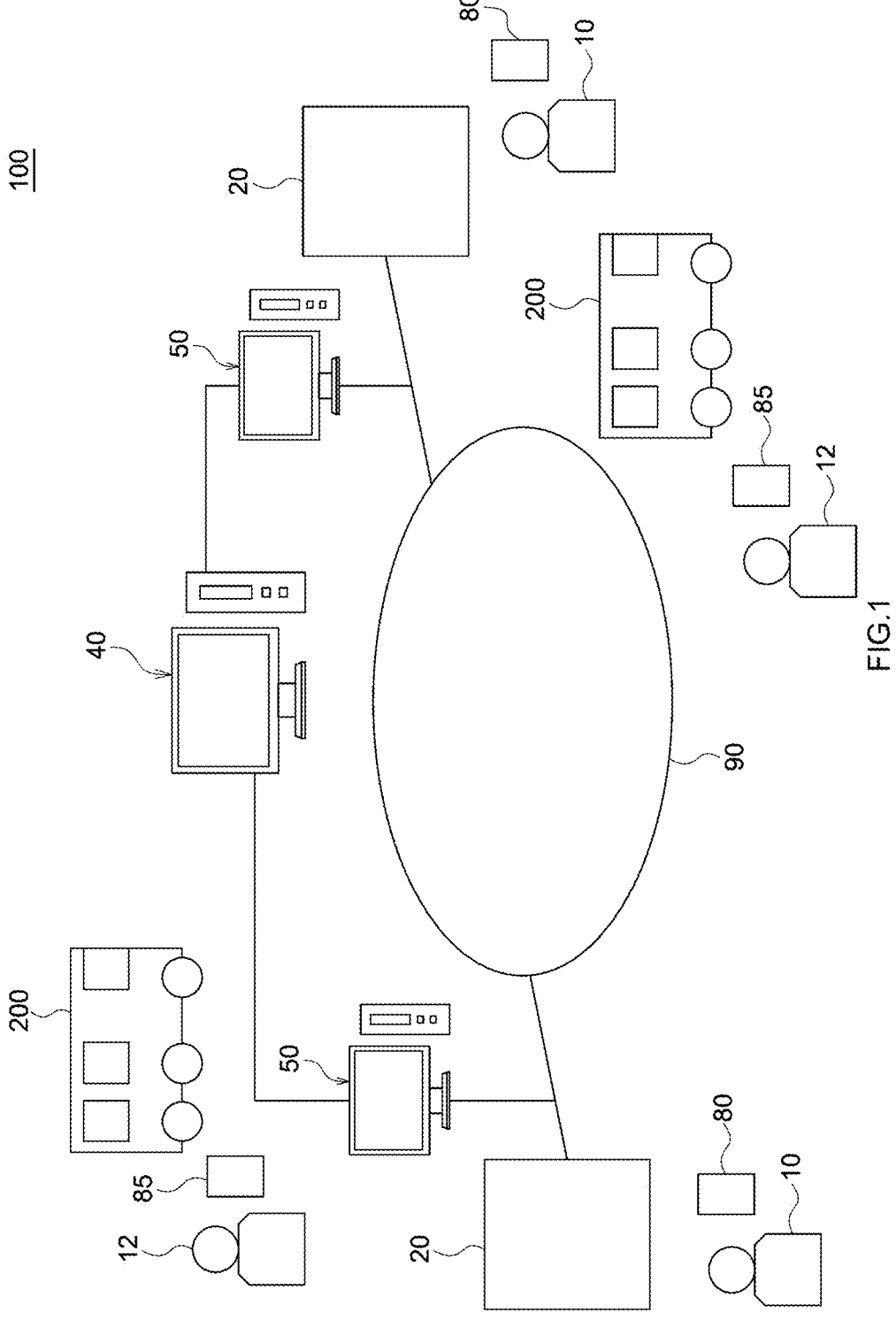
FIG. 1 is a conceptual diagram schematically illustrating an example of an electric power supply-demand adjustment system including a management device according to an embodiment.
Figure 2:
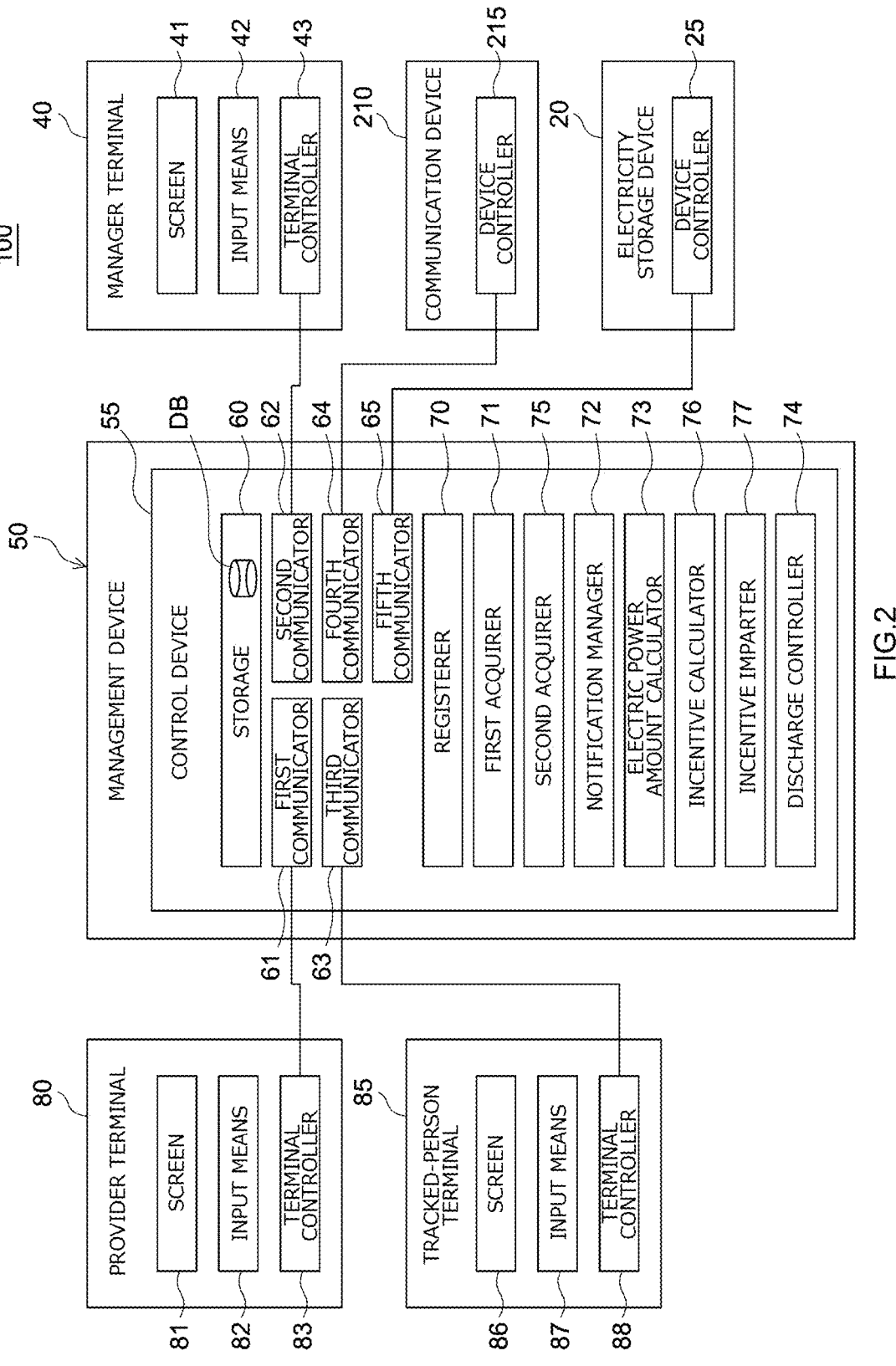
FIG. 2 is a block diagram of the electric power supply-demand adjustment system according to the embodiment.

FIG. 1 is a conceptual diagram illustrating an electric power supply-demand adjustment system 100 that includes a management device 50 according to the present embodiment. FIG. 2 is a block diagram illustrating the electric power supply-demand adjustment system 100. The management device 50 according to the present embodiment is a device that controls functional actions of charging and discharging (hereinafter, also referred to as "charge/discharge") of an electricity storage device 20 managed by an electric power provider 10, and adjusts electric power supply-demand of an electric power system 90.

The electricity storage device 20 is a device that stores electric power. The electricity storage device 20 is configured to be capable of supplying electric power stored therein to the electric power system 90. The electricity storage device 20 can include a battery, for example. Examples of the battery can include secondary batteries such as lithium-ion secondary batteries and nickel-metal hydride secondary batteries, and electricity storage devices such as electrical double-layer capacitors and so forth. Note that the electricity storage device 20 is not limited to being installed in homes, commercial establishments, and so forth, as electric power facilities, and may be installed in a vehicle as a driving power source.

The electricity storage device 20 managed by the management device 50 disclosed herein stores electric power generated using renewable enemy. Renewable energy as used here refers to solar power, waterpower, wind power, geothermal power, biomass, and so forth. Electric power generated using such renewable energy is referred to as "green electricity". Such green electricity may emit $CO_2$ when running electric power generators and generating electricity, but is capable of markedly reducing $CO_2$ as compared to electric power generation using fossil fuels such as oil, coal, natural gas, and so forth. Thus, this green electricity can be said to be electric power regarding which consideration has been given to effects on environmental issues.

In the present embodiment, the management device 50 is included in the electric power supply-demand adjustment system 100 of the electric power system 90 (hereinafter, referred to simply as "electric power supply-demand adjustment system 100"). The electric power supply-demand adjustment system 100 is a system that controls functional actions of charging/discharging the electricity storage device 20 managed by the electric power provider 10, thereby adjusting supply and demand of electric power in the electric power system 90. As illustrated in FIG. 1, the electric power supply-demand adjustment system 100 includes the electricity storage device 20, a manager terminal 40, the management device 50 that adjusts the electric power circulation amount by controlling functional actions of charging/discharging the electricity storage device 20, a provider terminal 80, and a tracked-person terminal 85. The electric power supply-demand adjustment system 100 can include a shared vehicle 200 that is used by a tracked person 12, who is registered in advance, in a manner associated with the electric power provider 10. The electric power supply-demand adjustment system 100 can include a separate electricity storage device capable of storing electric power of the electric power system 90, although omitted from illustration.

Now, the electric power provider 10 is a person that manages the electricity storage device 20, and provides electric power from the electricity storage device 20 that he/she manages to the electric power system 90. Also, the tracked person 12 is a person who is the object of tracking (object of monitoring) by the electric power provider 10, and is a person who is registered by the electric power provider 10 in a tracked person list as a person who is the object of tracking, for example. As one example, a case can be envisioned in which the tracked person 12 is a child, and the electric power provider 10 is a parent of this child. Alternatively, a case can be envisioned in which the tracked person 12 is an elderly parent, and the electric power provider 10 is a son, daughter, or the like, of the elderly parent. It should be noted, however, that the relation between the tracked person 12 and the electric power provider 10 is not limited to these relations.

The electric power supply-demand adjustment system 100 is a system that realizes input of electric power from the electricity storage device 20 that the electric power provider 10 manages to the electric power system 90, and output of electric power from the electric power system 90 to the electricity storage device 20. A plurality of electricity storage devices 20 that individual electric power providers 10 manage are connected to the electric power system 90 so as to be capable of charging/discharging. In the electric power supply-demand adjustment system 100, electric power is supplied from the electricity storage device 20 to the electric power system 90 on the basis of discharge demand regarding the electricity storage device 20 that the electric power provider 10 manages (in other words, a discharge request). Alternatively, in the electric power supply-demand adjustment system 100, electric power is supplied from the electric power system 90 to the electricity storage device 20 on the basis of charge demand regarding the electricity storage device 20 that the electric power provider 10 manages (in other words, a charge request). Thus, the circulation amount and timing of electric power in the electric power system 90 are managed in the electric power supply-demand adjustment system 100. Note that electric power stored in a separate electricity storage device connected to or incorporated into the electric power system 90, and electric power circulating in the electric power system 90 from the electricity storage device 20, are sold to a predetermined corporate business or the like, such as an electric power utility company or the like. The electric power supply-demand adjustment system 100 can be a system used for trading electricity, i.e., when selling electricity and purchasing electricity.

The one who manages the electric power supply-demand adjustment system 100 is referred to as "system manager" here (this expression may include devices that can manage the system themselves in some cases). The system manager may also be referred to as "aggregator". The system manager adjusts the circulation amount of electric power of the plurality of electricity storage devices 20 connected to the electric power system 90, so that the balance of supply and demand of electric power is maintained in the electric power system 90. The system manager preferably enters into agreement with a greater number of electric power providers 10 to secure a necessary amount of electric power, and preferably manages a greater number of electricity storage devices 20 via the management device 50.

In the technology disclosed herein, the green electricity that is generated using renewable energy is the primary object of the electric power supplied from the electricity storage devices 20 to the electric power system 90. In recent years, there is growing interest in green electricity, of which the load on the global environment is small, and management of electric power using such green electricity is expected to be widely used hereafter. Accordingly, the aggregator preferably enters into agreement with a greater number of electric power providers 10 that can provide the electric power system 90 with green electricity.

Now, the electric power system 90 is made up of electrical facilities that perform electricity generation, electrical power transmission, electrical power transformation, electrical power distribution, and so forth (including an electrical power distribution grid). In the electric power system 90, electric power can be supplied to unshown electrical facilities of electric power providers 10 in accordance with demand for electric power therein. The amount of electric power is adjusted so that the balance of supply and demand of electric power is maintained. Such adjustment of supply and demand of electric power can be managed by the system manager serving as the aggregator. The system manager can manage and adjust the electric power circulation amount from the electricity storage devices 20 to the electric power system 90 using the management device 50. For example, the charge/discharge state of the electricity storage devices 20 can be controlled in accordance with the demand for electric power in the electric power system 90. In a case in which electric power is lacking in the electric power system 90, actions of the electricity storage devices 20 are controlled such that the electricity storage devices 20 are discharged. As a result, electric power is input from the electricity storage devices 20 to the electric power system 90. Conversely, in a case in which electric power is in a state of excess in the electric power system 90, actions of the electricity storage devices 20 are controlled such that the electricity storage devices 20 are charged. As a result, electric power is output from the electric power system 90 to the electricity storage devices 20.

The manager terminal 40 is a terminal used by the system manager (e.g., aggregator). The system manager can comprehend the demand for electric power in the electric power system 90 by using the manager terminal 40. The system manager is also capable of instructing the electricity storage devices 20 to perform charging/discharging actions of electric power to and from the electric power system 90, via the management device 50, by using the manager terminal 40. The manager terminal 40 is realized by a desktop or laptop personal computer that the system manager uses, for example. The manager terminal 40 can also be realized by a smartphone or a tablet terminal. As illustrated in FIG. 2, the manager terminal 40 includes a screen 41, input means 42 for the system manager to perform inputting by operating, such as a keyboard, mouse, touch panel, or the like, and a terminal controller 43. The terminal controller 43 is communicably connected to the screen 41 and the input means 42.

The provider terminal 80 is a terminal that the electric power provider 10 uses. The provider terminal 80 is an example of a communication terminal. The provider terminal 80 may be a smartphone, a tablet terminal, or a desktop or laptop personal computer, that the electric power provider 10 uses, for example. As illustrated in FIG. 2, the provider terminal 80 includes a screen 81, input means 82 for the electric power provider 10 to perform inputting by operating, such as a touch panel, keyboard, mouse, or the like, and a terminal controller 83. The terminal controller 83 is communicably connected to the screen 81 and the input means 82.

The tracked-person terminal 85 is a terminal used by the tracked person 12. The tracked-person terminal 85 may be a smartphone or tablet terminal used by the tracked person 12, for example. As illustrated in FIG. 2, the tracked-person terminal 85 includes a screen 86, input means 87 for the tracked person 12 to perform inputting by operating, such as a touch panel, keyboard, mouse, or the like, and a terminal controller 88. The terminal controller 88 is communicably connected to the screen 86 and the input means 87. The tracked-person terminal 85 preferably includes a configuration for acquiring the current location (e.g., a Global Positioning System (GPS) sensor or the likes that receives GPS information from GPS satellites, etc.).

The shared vehicle 200 is a type of transportation vehicle that is used for tracked persons 12 registered in advance in association with electric power providers 10 use to travel among predetermined spots. The shared vehicle 200 typically is a vehicle that transports a large number of unspecified users from a predetermined spot to another predetermined spot. Examples thereof include share-ride busses, share-ride taxis, and so forth. The shared vehicle 200 may be a vehicle that uses fuel (gasoline or the like) as the driving source, may be an electric vehicle that uses electric power as the driving source, or may be a hybrid vehicle, a plug-in hybrid vehicle, or the like, that uses fuel and electric power as the driving source. The shared vehicle 200 can include a communication device 210 that is configured to be communicable with the management device 50.

The shared vehicle 200 is effective as means for members of society who have limited transportation access (e.g., children, elderly, etc.) to travel to a desired destination. That is to say, the shared vehicle 200 serves as effective means for tracked persons 12 such as described above to travel to a desired destination. Also, the shared vehicle 200 is generally used by a plurality of users at the same time, and accordingly, using the shared vehicle 200 to travel to predetermined spots enables $CO_2$ emissions to be reduced as compared to when individuals each use their own vehicles to travel to a predetermined spot. Accordingly, promoting usage of the shared vehicle 200 is preferable, since the load on the global environment can be reduced.

However, in a case of a tracked person 12 such as described above using the shared vehicle 200, the electric power provider 10 who is in a position of tracking the tracked person 12 may not be able to sufficiently confirm whether the tracked person 12 has safely reached the predetermined spot. Accordingly, from the perspective of the electric power provider 10, being able to confirm whether or not the tracked person 12 has safely used the shared vehicle 200 and reached the predetermined spot would give ease of mind, which would facilitate promotion of the tracked person 12 actively using the shared vehicle 200.

Accordingly, the management device 50 disclosed herein acquires usage history information indicating a history of the tracked person 12 registered in advance in a manner associated with the electric power provider 10 has used the shared vehicle 200, and notifies the provider terminal 80 of the electric power provider 10 of the usage history information. The management device 50 calculates an electric power amount to be input to the electric power system 90 from the electricity storage device 20 that the electric power provider 10 manages, on the basis of notification of the usage history information being performed. Actions of the electricity storage device 20 are then controlled such that discharge of the calculated electric power amount is performed from the electricity storage device 20 managed by the electric power provider 10 to the electric power system

90. The management device 50 may be realized by a single computer, or may be realized by a plurality of computers collaborating. The management device 50 is managed by the system manager of the electric power supply-demand adjustment system 100.

The management device 50 is communicably connected to the manager terminal 40, the electricity storage device 20, the provider terminal 80, the tracked-person terminal 85, and the communication device 210 of the shared vehicle 200, via a network such as the Internet or the like. The management device 50 includes a control device 55. Note that the management device 50 may include a screen and input means in the same way as with the manager terminal 40, although omitted from illustration.

The configuration of the control device 55 is not limited in particular. The control device 55 here is a microcomputer, for example. The control device 55 includes an interface, a central processing unit (CPU), read-only memory (ROM), and random-access memory (RAM), for example. As illustrated in FIG. 2, the control device 55 includes a first acquirer 71, a notification manager 72, an electric power amount calculator 73, and a discharge controller 74. The control device 55 may include, besides the above components 71 to 74, storage 60, a first communicator 61, a second communicator 62, a third communicator 63, a fourth communicator 64, and a fifth communicator 65. The control device 55 may further include a registerer 70, a second acquirer 75, an incentive calculator 76, and an incentive imparter 77. Note that the components 60 to 77 of the control device 55 may be realized by a single or a plurality of processors, or may be embedded in a circuit.

The first communicator 61 is configured to be communicable with the provider terminal 80 of the electric power provider 10. The first communicator 61 here is communicably connected to the terminal controller 83 of the provider terminal 80. The second communicator 62 is configured so as to be communicable with the manager terminal 40. The second communicator 62 here is communicably connected to the terminal controller 43 of the manager terminal 40. The third communicator 63 is communicably connected to the tracked-person terminal 85. The third communicator 63 here is communicably connected to the terminal controller 88 of the tracked-person terminal 85. The fourth communicator 64 is communicably connected to the communication device 210 of the shared vehicle 200. The fourth communicator 64 here is communicably connected to a device controller 215 of the communication device 210. The fifth communicator 65 is communicably connected to the electricity storage device 20. The fifth communicator 65 here is communicably connected to a device controller 25 of the electricity storage device 20.

Figure 3:
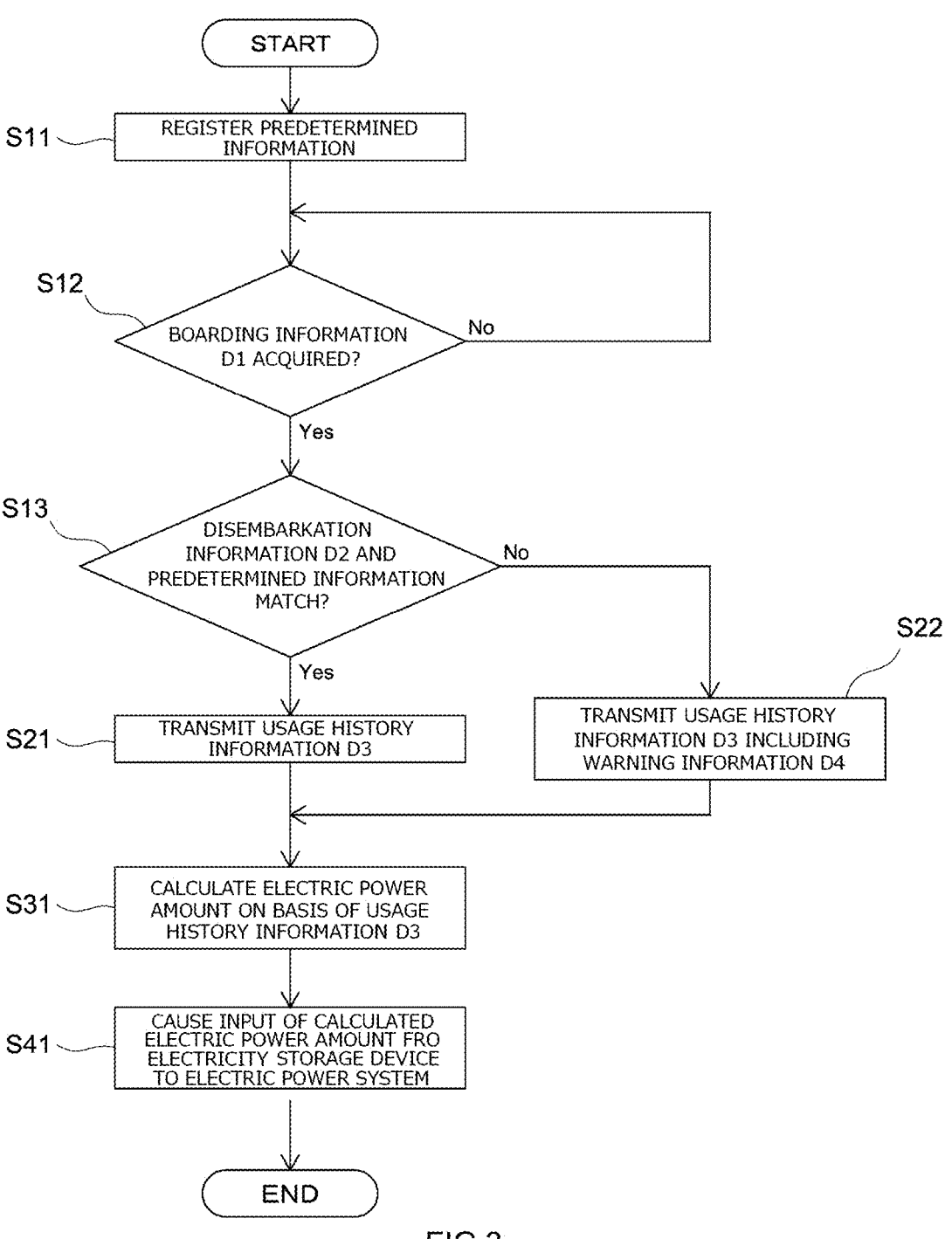
FIG. 3 is a flowchart showing procedures in an electric power supply-demand adjustment method according to the embodiment.

FIG. 3 is a flowchart showing processing procedures carried out by the management device 50. The electric power supply-demand adjustment method disclosed herein includes, generally speaking, a step S10 of acquiring usage history information indicating history of usage of the shared vehicle 200 by a tracked person 12 who is registered in advance in a manner associated with an electric power provider 10, a step S20 of notifying the electric power provider 10 of the acquired usage history information of the tracked person 12, a step S30 of calculating the electric power amount to be input from the electricity storage device 20 to the electric power system 90 on the basis of notification of the usage history information, and a step S40 of causing the electricity storage device 20 to input the calculated electric power amount to the electric power system 90.

In the following, specific processing procedures for realizing the above electric power supply-demand adjustment will be described with reference to FIG. 3. Processing of S11 to S41 can be realized by processing following programs installed in the management device 50. Note that an example of processing executed by the management device 50 is shown here, and processing executed by the management device 50 is not limited to that exemplified here.

In step S11 in FIG. 3, the registerer 70 in FIG. 2 registers predetermined information relating to the tracked person 12. Predetermined information as used here can be hoarding schedule information and disembarkation schedule information for the tracked person 12 using the shared vehicle 200. Boarding schedule information can be a scheduled time for the tracked person 12 to board the shared vehicle 200, a scheduled spot (e.g., name of a bus stop from which boarding is scheduled) from which the tracked person 12 is scheduled to board the shared vehicle 200, and so forth. Disembarkation schedule information can be, for example, a scheduled time for the tracked person 12 to disembark from the shared vehicle 200, a scheduled spot (e.g., name of a bus stop at which disembarking is scheduled) at which the tracked person 12 is scheduled to disembark from the shared vehicle 200, and so forth. The method of registering the predetermined information regarding the tracked person 12 (boarding schedule information and disembarkation schedule information here) is not limited in particular. For example, the electric power provider 10 can register the boarding schedule information and the disembarkation schedule information of the tracked person 12 using the provider terminal 80. The provider terminal 80 is provided with the screen 81 and the input means 82 as illustrated in FIG. 2, for example. An input screen (omitted from illustration) for boarding schedule information and disembarkation schedule information of the tracked person 12, for example, is displayed on the screen 81. The electric power provider 10 operates the input means 82 and inputs information in the input screen for boarding schedule information and disembarkation schedule information, such as a scheduled boarding time, scheduled disembarking time, scheduled boarding spot, scheduled disembarking spot, and so forth, for the tracked person 12 using the shared vehicle 200. Upon the predetermined information of the tracked person 12 being input, the terminal controller 83 of the provider terminal 80 transmits this information to the management device 50 via the first communicator 61 of the management device 50. Accordingly, the registerer 70 can acquire the predetermined information of the tracked person 12. The predetermined information is associated with the electric power provider 10, and is stored in a database DB in the storage 60. Note however, that registration of the predetermined information is an optional step, and can be omitted in other embodiments.

Note that the method of registering the electric power provider 10 and the tracked person 12 in an associated manner is not limited in particular. For example, the electric power provider 10 can register the tracked person 12 in an associated manner with him/herself by inputting (setting) the tracked person 12 as a person who is the object of tracking (monitoring object) by him/herself, using the provider terminal 80. For example, the tracked person 12 is preferably input (set) by operating the screen 81 and the input means 82 of the provider terminal 80 illustrated in FIG. 2. A tracked person setting screen (omitted from illustration), for example, is displayed on the screen 81. The electric power provider 10 operates the input means 82 to input at least identification information of the person that the electric power provider 10 wants to set as the object of tracking (e.g., name and identification number (ID), etc., of the tracked person 12), and identification information of the tracked-person terminal 85 that the person to be the object of tracking uses. Upon inputting the identification information of the tracked person 12 and the tracked-person terminal 85, the terminal controller 83 of the provider terminal 80 transmits this identification information to the management device 50 via the first communicator 61 of the management device 50. Accordingly, the registerer 70 can acquire the identification information of the tracked person 12 and the tracked-person terminal 85. The identification information of the tracked person 12 and the tracked-person terminal 85 is associated with the electric power provider 10 and stored in the database DB in the storage 60.

In step S12 in FIG. 3, the first acquirer 71 in FIG. 2 determines whether or not the tracked person 12 registered in advance in an associated manner with the electric power provider 10 has boarded the shared vehicle 200. For example, the tracked person 12 registered in advance in an associated manner with the electric power provider 10 operates the screen 86 and the input means 87 of his/her tracked-person terminal 85 when starting usage of the shared vehicle 200 (e.g., when boarding the shared vehicle 200), and transmits boarding information D1 to the management device 50. A boarding information input screen (omitted from illustration), for example, is displayed on the screen 86 of the tracked-person terminal 85. Upon the tracked person 12 operating the input means 87 to input the boarding information D1, the terminal controller 88 of the tracked-person terminal 85 transmits the boarding information D1 to the management device 50 via the third communicator 63 of the management device 50. Accordingly, the first acquirer 71 of the management device 50 can acquire the boarding information D1. This boarding information D1 includes at least information whereby the tracked person 12 can be identified (e.g., identification number (ID) name, etc., of the tracked person 12). The boarding information D1 may also include, for example, the spot at which the tracked person 12 boarded the shared vehicle 200, the time at which the shared vehicle 200 was boarded, the current location information of the tracked person 12, and so forth, as information indicating usage history of the shared vehicle 200. The current position information of the tracked person 12 can be, for example, information acquired by a GPS sensor that the tracked-person terminal 85 can be equipped with, or the like. In a case of acquiring the boarding information D1, the management device 50 determines that the tracked person 12 has boarded the shared vehicle 200. In a case of acquiring the boarding information D1 (YES in S12), the flow advances to step S13. Note that the acquired boarding information D1 is associated with the electric power provider 10 and stored in the database DB in the storage 60.

Note that the means for determining that the tracked person 12 has boarded the shared vehicle 200 in step S12 in FIG. 3 is not limited to the above-described form. For example, the management device 50 may acquire the boarding information D1 transmitted by the tracked person 12 touching (or holding close) the tracked-person terminal 85 to the communication device 210 installed in the shared vehicle 200. Specifically, when starting use of the shared vehicle 200 (e.g., when boarding the shared vehicle 200), the tracked person 12 touches (or holds close) his/her own tracked-person terminal 85 to the communication device 210 of the shared vehicle 200. Accordingly, the communication device 210 of the shared vehicle 200 transmits the boarding information D1 to the management device 50 via the fourth communicator 64 of the management device 50. The first acquirer 71 of the management device 50 can then acquire the boarding information D1. In a case of acquiring the boarding information D1, the management device 50 can determine that the tracked person 12 has boarded the shared vehicle 200.

Conversely, in a case in which the boarding information D1 is not acquired (NO in S12), the flow stands by until the boarding information D1 is acquired. A configuration may be made in which, in a case where the boarding information D1 is not acquired at the first acquirer 71 even after a predetermined amount of time has elapsed, the flow advances to a later-described step S22, although this is not limiting in particular. The predetermined time here may be a case in which the scheduled boarding time registered in the registerer 70 has passed, for example.

Also, the first acquirer 71 in FIG. 2 may be configured to determine whether or not the acquired boarding information D1 matches predetermined information registered in the registerer 70 (scheduled boarding information here). For example, upon the tracked person 12 operating the input means 87 of the tracked-person terminal 85 and inputting the boarding information D1 as described above, the boarding information D1 is transmitted to the management device 50. At this time, information of the time of the tracked person 12 boarding the shared vehicle 200, and the spot of boarding thereof and so forth, are transmitted along with the identification information of the tracked person 12, whereby the first acquirer 71 can acquire this information. The first acquirer 71 then references the database DB stored in the storage 60, and determines whether or not the acquired information matches the scheduled boarding information of the tracked person 12. A configuration may be made in which the flow advances to the later-described step S22 in a case where the acquired information and the scheduled boarding information of the tracked person 12 do not match, for example.

In step S13 in FIG. 3, the first acquirer 71 in FIG. 2 determines whether or not the tracked person 12 has disembarked from the shared vehicle 200 under predetermined conditions. The predetermined conditions here can be a location or time at which the tracked person 12 should disembark, for example. The tracked person 12 registered in advance in an associated manner with the electric power provider 10 operates the screen 86 and the input means 87 of his/her own tracked-person terminal 85 when ending usage of the shared vehicle 200 (e.g., when disembarking from the shared vehicle 200), to transmit the disembarkation information D2 to the management device 50. A disembarkation information input screen (omitted from illustration), for example, is displayed on the screen 86 of the tracked-person terminal 85, and upon the disembarkation information D2 being input via the input means 87, the terminal controller 88 of the tracked-person terminal 85 transmits the disembarkation information D2 to the management device 50 via the third communicator 63 of the management device 50. Accordingly, the first acquirer 71 can acquire the disembarkation information D2. This disembarkation information D2 includes at least information by which the tracked person 12 can be identified. Also, the disembarkation information D2 may also include, for example, the spot at which the tracked person 12 disembarked from the shared vehicle 200, the time of the tracked person 12 disembarking from the shared vehicle 200, the current location information of the tracked person 12, and so forth, as information indicating usage history of the shared vehicle 200. In a case of acquiring the disembarkation information D2, the management device 50 determines that the tracked person 12 has disembarked from the shared vehicle 200. The first acquirer 71 then references the database DB stored in the storage 60, and determines whether or not the acquired disembarkation information D2 matches predetermined information of the tracked person 12 (scheduled disembarkation information here). In a case in which the acquired disembarkation information D2 matches the predetermined information of the tracked person 12 (scheduled disembarkation information here) that is registered in the registerer 70, for example, the first acquirer 71 determines that the tracked person 12 has disembarked from the shared vehicle 200 under predetermined conditions (e.g., the scheduled spot or time). In a case where the acquired disembarkation information D2 and the predetermined information of the tracked person 12 registered in the registerer 70 match (YES in S13), the flow advances to step S21. The disembarkation information D2 acquired by the first acquirer 71 is associated with the electric power provider 10 and stored in the database DB in the storage 60.

Note that the means for determining whether or not the tracked person 12 has disembarked from the shared vehicle 200 under the predetermined conditions in step S13 in FIG. 3 is not limited to the above-described form. For example, the management device 50 may acquire the disembarkation information D2 transmitted by the tracked person 12 touching (or holding close) the tracked-person terminal 85 to the communication device 210 installed in the shared vehicle 200 again. Specifically, when ending use of the shared vehicle 200 (e.g., when disembarking from the shared vehicle 200), the tracked person 12 touches (or holds close) his/her own tracked-person terminal 85 again to the communication device 210 of the shared vehicle 200. The communication device 210 of the shared vehicle 200 preferably is configured to transmit the disembarkation information D2 of the tracked person 12 to the management device 50 via the fourth communicator 64 of the management device 50 in a case in which the tracked-person terminal 85 is touched to the communication device 210 again following transmission of the boarding information D1. The first acquirer 71 can thus acquire the disembarkation information D2. This disembarkation information D2 can include the spot at which the tracked person 12 disembarked from the shared vehicle 200 and so forth, for example, as information indicating usage history of the shared vehicle 200, as described above. The first acquirer 71 then references the database DB stored in the storage 60, and determines whether or not the acquired disembarkation information D2 matches the predetermined information (scheduled disembarkation information here) of the tracked person 12 registered in the registerer 70. In a case where the acquired disembarkation information D2 matches the predetermined information of the tracked person 12 registered in the registerer 70, the first acquirer 71 can determine that the tracked person 12 disembarked from the shared vehicle 200 under the predetermined conditions.

In step S21 in FIG. 3, the notification manager 72 in FIG. 2 transmits usage history information D3 including at least the boarding information D1 and/or the disembarkation information D2 to the provider terminal 80 of the electric power provider 10 via the first communicator 61. The usage history information D3 is preferably configured to be displayed on the screen 81 of the provider terminal 80, for example. Thus, the electric power provider 10 can confirm the usage history of the shared vehicle 200 by the tracked person 12. Accordingly, the electric power provider 10 can allow the tracked person 12 to use the shared vehicle 200 with ease of mind.

Conversely, in a case in which the acquired disembarkation information D2 and the predetermined information of the tracked person 12 registered in the registerer 70 do not match (NO in S13), the flow advances to step S22. In step S22, the notification manager 72 in FIG. 2 transmits usage history information D3 including warning information D4 to the provider terminal 80 of the electric power provider 10 via the first communicator 61. Now, the warning information D4 is information notifying of an abnormality regarding the tracked person 12. For example, the warning information D4 may be information transmitted in a case in which the acquired boarding information D1 and/or disembarkation information D2 do not match the scheduled boarding information and scheduled disembarkation information registered in the registerer 70.

The notification manager 72 is configured to, in a case in which the disembarkation information D2 acquired at the first acquirer 71 does not match the predetermined information of the tracked person 12 registered in the registerer 70 here, transmit the usage history information D3 including the warning information D4 to the provider terminal 80 of the electric power provider 10 via the first communicator 61. The electric power provider 10 who has confirmed the warning information D4 on the provider terminal 80 can contact the tracked person 12 via the tracked-person terminal 85, for example, and confirm the situation. Accordingly, the electric power provider 10 can allow the tracked person 12 to use the shared vehicle 200 with further ease of mind.

Also, the warning information D4 may be information that is transmitted in a case in which the hoarding information D1 is received from the tracked-person terminal 85 of the tracked person 12, but no disembarkation information D2 is received even after a predetermined amount of time has elapsed (i.e., a case in which the tracked person 12 is determined not to have disembarked). The notification manager 72 is preferably configured such that, in a case in which the first acquirer 71 acquires the boarding information D1 but thereafter does not acquire the disembarkation information D2 even though a predetermined amount of time elapses, the notification manager 72 transmits the usage history information D3 including the warning information D4 to the provider terminal 80 of the electric power provider 10, via the first communicator 61, for example. Note that it is sufficient for the predetermined amount of time to be set as appropriate, and is not limited in particular. For example, settings may be made in advance to transmit the warning information D4 after a certain amount of time (e.g., around 1 to 3 hours) elapses after the first acquirer 71 acquires the boarding information D1, or settings may be made in advance to transmit the warning information D4 after the scheduled disembarkation time registered in the registerer 70 has passed.

Note however, that transmission of the usage history information D3 including the warning information D4 is an optional step, and can be omitted from other embodiments.

In step S31 in FIG. 3, the electric power amount calculator 73 in FIG. 2 calculates the electric power amount to be input from the electricity storage device 20 to the electric power system 90, on the basis of the notification manager 72 transmitting the usage history information D3. For example, the electric power amount calculator 73 is preferably configured such that each time the notification manager 72 transmits the usage history information 133 to the provider terminal 80 a predetermined number of times, a predetermined amount of electric power to be input to the electric power system 90 from the electricity storage device 20 that the electric power provider 10 manages is calculated (e.g., each time the usage history information D3 is transmitted once, 10 kWh is calculated as electric power to be input from the electricity storage device 20 to the electric power system 90, etc.). Preferably, this configuration is such that the greater the number of times of transmission of the usage history information D3 to the provider terminal 80 is, the greater the electric power amount calculated to be input from the electricity storage device 20 to the electric power system 90 is. Thus, usage of the shared vehicle 200 is promoted, and at the same time, the circulation amount of green electricity increases, and accordingly the load on the global environment can be further reduced.

The electric power amount calculator 73 preferably is configured to increase/decrease the electric power amount to be input from the electricity storage device 20 to the electric power system 90 in accordance with the type of information transmitted to the provider terminal 80 as the usage history information D3, for example. Preferably, this configuration is such that in a case of notifying the electric power provider 10 of usage history information D3 of more thorough contents, for example, the electric power amount to be input from the electricity storage device 20 to the electric power system 90 is increased. Preferably, this configuration is such that the electric power amount to be input from the electricity storage device 20 to the electric power system 90 is calculated to be greater in a case in which the boarding information D1 and the disembarkation information D2 are transmitted to the provider terminal 80 as the usage history information D3, as compared to a case of transmitting one of the boarding information D1 and the disembarkation information D2 to the provider terminal 80. Also, preferably, this configuration is such that the electric power amount to be input from the electricity storage device 20 to the electric power system 90 is calculated to be greater in a case in which the boarding information D1 and the warning information D4 are transmitted to the provider terminal 80 as the usage history information D3, as compared to a case in which one of the boarding information D1, the disembarkation information D2, and the warning information D4 is transmitted to the provider terminal 80. By making the usage history information D3 to be more thorough, the electric power provider 10 can have greater ease of mind regarding the tracked person 12 using the shared vehicle 200. Thus, usage of the shared vehicle 200 is promoted, and at the same time, the circulation amount of green electricity increases, and accordingly the load on the global environment can be further reduced.

Also, the boarding information D1 can include, as information indicating usage history of the shared vehicle 200, the boarding spot of the tracked person 12 boarding the shared vehicle 200, boarding time, current location information, and so forth, as described above. The disembarkation information D2 can include, as information indicating usage history of the shared vehicle 200, the disembarking spot of the tracked person 12 disembarking from the shared vehicle 200, the time of disembarkation, and so forth, as described above. Preferably, the configuration is such that the electric power amount to be input from the electricity storage device 20 to the electric power system 90 is calculated to be greater in a case in which a plurality of types of the boarding information D1 (e.g., boarding time and boarding spot) are transmitted as the usage history information D3 to the provider terminal 80, as compared with a case of transmitting only one type of the boarding information D1 (e.g., boarding time alone) to the provider terminal 80, although this is not limiting in particular.

In step S41 in FIG. 3, the discharge controller 74 in FIG. 2 controls discharge actions of the electricity storage device 20 so as to input the electric power amount calculated by the electric power amount calculator 73 from the electricity storage device 20 to the electric power system 90. The discharge controller 74 instructs the device controller 25 of the electricity storage device 20 via the fifth communicator 65 to discharge, from the electric power stored in the electricity storage device 20, electric power of an amount corresponding to the electric power amount calculated by the electric power amount calculator 73, to the electric power system 90. The device controller 25 of the electricity storage device 20 that has received this instruction inputs the electric power amount calculated by the electric power amount calculator 73 from the electricity storage device 20 to the electric power system 90.

This realizes the electric power supply-demand adjustment method disclosed herein. In the technology disclosed herein, the electric power input from the electricity storage device 20 managed by the electric power provider 10 to the electric power system 90 is green electricity, as described above. This green electricity can be enemy of which the load on the environment is small. Also, due to the tracked persons 12 traveling to a desired spot using the shared vehicle 200, the load on the environment is smaller as compared to each tracked person 12 traveling using respective vehicles. Accordingly, a framework is provided in which the tracked persons 12 can ride the shared vehicle 200 with ease of mind, and also the electric power amount (more specifically, electric power amount of green electricity) to be input from the electricity storage device 20 to the electric power system 90 on the basis of usage history information of the shared vehicle 200 being notified is calculated, whereby both promotion of usage of the shared vehicle 200 and promotion of widespread use of green electricity can be realized.

Figure 4:
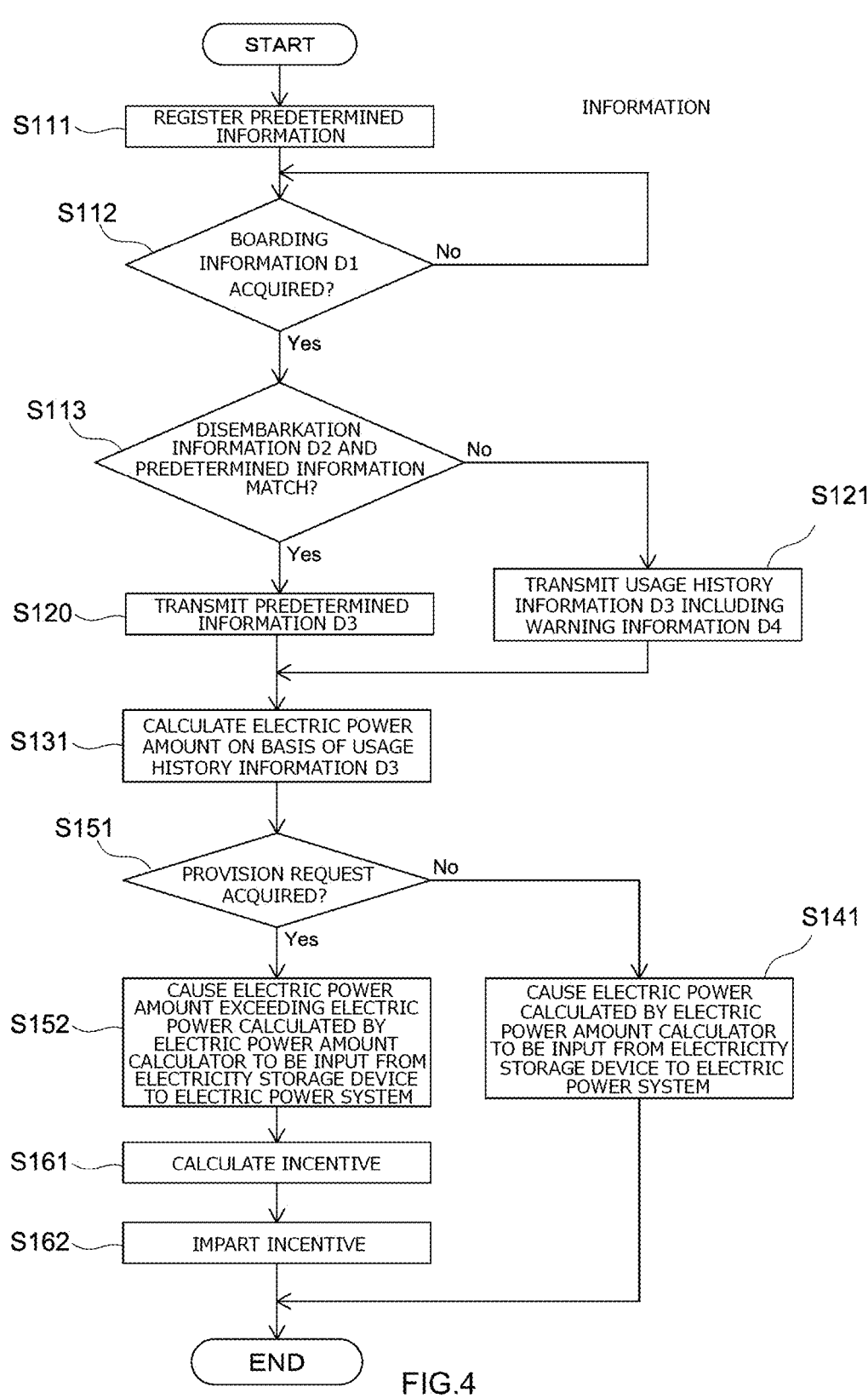
FIG. 4 is a flowchart showing procedures in the electric power supply-demand adjustment method according to the embodiment, in a case of acquiring a provision request.

The management device 50 preferably further includes the second acquirer 75 configured to acquire provision requests from the electric power system 90, requesting the electricity storage device 20 for provision of electric power. In a case of acquiring a provision request at the second acquirer 75, the management device 50 controls discharging actions of the electricity storage device 20 so as to input electric power of an amount that exceeds the electric power amount calculated by the electric power amount calculator 73, from the electricity storage device 20 to the electric power system 90. The management device 50 may be configured so that an incentive is imparted to the electric power provider 10 in a case of controlling discharging actions of the electricity storage device 20 so as to input electric power of an amount that exceeds the electric power amount calculated by the electric power amount calculator 73, from the electricity storage device 20 to the electric power system 90. FIG. 4 is a flowchart showing processing procedures of the electric power supply-demand adjustment method in a case of acquiring a provision request. Processing of S111 to S162 can be realized by processing following programs installed in the management device 50. Note that an example of processing executed by the management device 50 is shown here, and processing executed by the management device 50 is not limited to that exemplified here. Also, steps S111 to S141 in FIG. 4 are the same as steps S11 to S41 in FIG. 3 described above, and accordingly detailed description will be omitted.

First, in step S151 in FIG. 4, the second acquirer 75 in FIG. 2 determines whether or not a provision request to the electricity storage device 20 has been acquired. In a case of acquiring a provision request signal via the second communicator 62, the second acquirer 75 determines that a provision request has been acquired from the electric power system 90 (YES in S151). In a case of acquiring a provision request (YES in S151), the flow advances to step S152. Conversely, in a case of not acquiring a provision request (NO in S151), the flow advances to step S141.

Now, a provision request signal is a signal that is transmitted from the manager terminal 40 to the management device 50, for example, in a case in which there is a shortage of electric power on the electric power system 90. The electric power supply-demand state of the electric power system 90 is comprehended at the manager terminal 40, and in a case in which there is a shortage of electric power on the electric power system 90 (or a case in which a shortage is foreseen), the manager terminal 40 transmits a provision request signal via the second communicator 62 of the management device 50. Accordingly, the second acquirer 75 can acquire the provision request signal. The manager terminal 40 here may be configured to transmit provision request information of necessary electric power amount (kWh), a part of day in which this electric power is necessary, or the like, along with the provision request signal. Thus, the second acquirer 75 can also acquire the provision request information of necessary electric power amount (kWh), a part of day in which this electric power is necessary, or the like.

In step S152 in FIG. 4, the discharge controller 74 in FIG. 2 controls discharging actions of the electricity storage device 20 so as to input electric power of an amount that exceeds the electric power amount calculated by the electric power amount calculator 73, from the electricity storage device 20 to the electric power system 90. Preferably, the configuration is such here that inputting electric power of an amount that exceeds the electric power amount calculated by the electric power amount calculator 73 from the electricity storage device 20 to the electric power system 90 is carried out by causing an electric power amount calculated on the basis of the provision request information transmitted by the manager terminal 40, for example, to be input from the electricity storage device 20 to the electric power system 90, so as to compensate for the shortage in electric power amount on the electric power system 90. The discharge controller 74 instructs the device controller 25 of the electricity storage device 20 via the fifth communicator 65 to input, of the electric power stored in the electricity storage device 20, electric power of an amount exceeding the electric power amount calculated by the electric power amount calculator 73, from the electricity storage device 20 to the electric power system 90. The device controller 25 of the electricity storage device 20 that has received this instruction causes an electric power amount exceeding the amount of the electric power calculated by the electric power amount calculator 73 to be input to the electric power system 90 from the electricity storage device 20. Accordingly, when there is a shortage of electric power on the electric power system 90, electric power exceeding the amount of electric power calculated by the electric power amount calculator 73 is supplied from that stored in the electricity storage device 20 to the electric power system 90, thereby contributing to adjusting balance of supply and demand of electric power on the electric power system 90.

In step S161 in FIG. 4, the incentive calculator 76 in FIG. 2 calculates an incentive to be imparted to the electric power provider 10. Typically, it is sufficient for the incentive calculator 76 to be configured to calculate an incentive with respect to the electric power amount exceeding the electric power amount calculated by the electric power amount calculator 73. It is sufficient for the incentive calculator 76 to be configured such that, for example, when the electric power amount calculated by the electric power amount calculator 73 is 10 kWh, and the second acquirer 75 acquires a provision request and causes the electricity storage device 20 to input electric power worth 20 kWh to the electric power system 90 as a result, an incentive equivalent to 10 kWh is calculated.

Now, the "incentive" can be a compensation for the electricity storage device 20 managed by the electric power provider 10 providing the electric power amount exceeding the electric power amount calculated by the electric power amount calculator 73. The type of incentive is not limited in particular, and for example may be an entitlement receive transmission of the usage history information D3 a predetermined number of times (also referred to as "ticket book"), may be an entitlement to make the transmitted contents of the usage history information D3 more thorough. Alternatively, the incentive may be items that are exchangeable for cash, such as coupons, vouchers, or the like.

In step S162 in FIG. 4, the incentive imparter 77 in FIG. 2 imparts the incentive calculated by the incentive calculator 76 to the electric power provider 10. Now, to "impart an incentive" means to correlate the electric power provider 10 and the incentive in the database DB stored in the storage 60, for example, whereby the incentive is registered as to the electric power provider 10. However, in a case in which the incentive is an item that is electronically exchangeable, for example, such as a ticket book of usage history information D3 or the like, for example, transmitting this ticket book to the provider terminal 80 of the electric power provider 10 may be imparting the incentive.

According to this configuration, green electricity is supplied from the electricity storage device 20 precisely at the timing at which electric power is needed on the electric power system 90. Thus, the load on the global environment can be markedly reduced, as compared to supplying electric power generated by thermal power generation or the like from another electric power system.

Although a specific example of the present disclosure has been described in detail, this is only exemplary, and does not limit the claims. The technology described in the claims encompasses various modifications and alterations to the specific examples exemplified above.

What is claimed is:

1. An electric power supply-demand adjustment method of an electric power system in which supply and demand of electric power on the electric power system is adjusted by inputting, from an electricity storage device that is configured to store electric power generated using renewable energy, at least the electric power to the electric power system, with the electricity storage device being configured to input the electric power from the electricity storage device to the electric power system, the electric power supply-demand adjustment method comprising:

acquiring usage history information indicating history of usage of a shared vehicle by a tracked person, registered in advance in a manner associated with an electric power provider that provides the electric power from the electricity storage device to the electric power system;

notifying the electric power provider of the acquired usage history information of the tracked person;

calculating an electric power amount to be input from the electricity storage device to the electric power system on the basis of notification of the usage history information; and causing the electricity storage device to input the calculated electric power amount to the electric power system.

2. The electric power supply-demand adjustment method according to claim 1, wherein in the calculating of the electric power amount, the greater a count of times of notifying the electric power provider of the usage history information is, the more the electric power amount calculated as the electric power amount to be input from the electricity storage device to the electric power system is increased.

3. The electric power supply-demand adjustment method according to claim 1, wherein the usage history information acquired in the acquiring of the usage history information includes at least one of boarding information indicating that the tracked person has boarded the shared vehicle, and disembarkation information indicating that the tracked person has disembarked from the shared vehicle.

4. The electric power supply-demand adjustment method according to claim 3, wherein in the calculating of the electric power amount, in a case of notifying the electric power provider of the boarding information and the disembarkation information as the usage history information, the electric power amount calculated as the electric power amount to be input from the electricity storage device to the electric power system is increased as compared to a case of notifying of one of the boarding information and the disembarkation information.

5. The electric power supply-demand adjustment method according to claim 1, further comprising:

acquiring a provision request requesting the electricity storage device to provide the electric power to the electric power system, wherein in the causing of the electricity storage device to input electric power to the electric power system, in a case of acquiring the provision request in the acquiring of the provision request, the electricity storage device is caused to input to the electric power system an electric power amount exceeding the electric power amount calculated in the calculating of the electric power amount.

6. The electric power supply-demand adjustment method according to claim 5, further comprising:

calculating an incentive to be imparted to the electric power provider, wherein in the calculating of the incentive, a predetermined incentive is calculated, in a case in which, in the causing of the electricity storage device to input electric power to the electric power system, the electricity storage device is caused to input to the electric power system an electric power amount exceeding the electric power amount calculated in the calculating of the electric power amount.

7. A management device of an electricity storage device, the management device managing an electric power circulation amount of the electricity storage device that stores electric power generated using renewable energy and that is connected to input the stored electric power to an electric power system, the management device comprising:

a first acquirer configured to acquire usage history information indicating history of usage of a shared vehicle by a tracked person, registered in advance in a manner associated with an electric power provider that manages the electricity storage device;

a notification manager configured to transmit the usage history information of the tracked person acquired by the first acquirer to a communication terminal of the electric power provider;

an electric power amount calculator configured to calculate an electric power amount to be input from the electricity storage device to the electric power system on the basis of the notification manager having transmitted the usage history information to the communication terminal of the electric power provider; and a discharge controller configured to control discharge operations of the electricity storage device, to input the electric power amount calculated by the electric power amount calculator from the electricity storage device to the electric power system.

8. The management device according to claim 7, wherein the greater a count of times of the notification manager transmitting the usage history information of the tracked person to the communication terminal of the electric power provider is, the more the electric power amount calculator increases the electric power amount calculated as the electric power amount to be input from the electricity storage device to the electric power system.

9. The management device according to claim 7, wherein the usage history information acquired by the first acquirer includes at least one of boarding information indicating that the tracked person has boarded the shared vehicle, and disembarkation information indicating that the tracked person has disembarked from the shared vehicle.

10. The management device according to claim 9, wherein in a case of transmitting the boarding information and the disembarkation information to the communication terminal of the electric power provider as the usage history information, the electric power amount calculator increases the electric power amount calculated as the electric power amount to be input from the electricity storage device to the electric power system as compared to a case of transmitting one of the boarding information and the disembarkation information to the communication terminal of the electric power provider.

11. The management device according to claim 7, further comprising:

a second acquirer configured to acquire a provision request requesting the electricity storage device to provide the electric power to the electric power system, wherein in a case of the second acquirer acquiring the provision request, the discharge controller controls discharge operations of the electricity storage device to input from the electricity storage device to the electric power system an electric power amount exceeding the electric power amount calculated by the electric power amount calculator.

12. The management device according to claim 11, further comprising:

an incentive calculator configured to calculate an incentive to be imparted to the electric power provider, wherein the incentive calculator is configured to calculate a predetermined incentive, in a case in which the discharge controller controls the discharge operations of the electricity storage device so as to input electric power exceeding the electric power amount calculated by the electric power amount calculator from the electricity storage device to the electric power system.

\* \* \* \* \*